United States Patent [19]

Imamura et al.

[11] Patent Number: 5,598,324
[45] Date of Patent: Jan. 28, 1997

[54] RESONANCE POWER CIRCUIT WITH CLAMPING CIRCUIT

[75] Inventors: Nobuaki Imamura; Nobuhiro Oyama, both of Kanagawa, Japan

[73] Assignee: Murata Manufacturing Co., Ltd., Japan

[21] Appl. No.: 620,593

[22] Filed: Mar. 22, 1996

Related U.S. Application Data

[63] Continuation of Ser. No. 126,085, Sep. 23, 1993, abandoned.

[30] Foreign Application Priority Data

Sep. 25, 1992 [JP] Japan .................................. 4-280555
Oct. 13, 1992 [JP] Japan .................................. 4-300460
Jul. 29, 1993 [JP] Japan .................................. 5-208985

[51] Int. Cl.⁶ .................................................. H02M 3/335
[52] U.S. Cl. .............................. 363/21; 363/97; 363/131
[58] Field of Search ................................ 363/20, 21, 56, 363/97, 131

[56] References Cited

U.S. PATENT DOCUMENTS

| | | | |
|---|---|---|---|
| 4,772,810 | 9/1988 | Felps | 307/253 |
| 4,785,387 | 11/1988 | Lee et al. | 363/21 |
| 4,975,821 | 12/1990 | Lethellier | 363/21 |
| 5,019,953 | 5/1991 | Kawaberi et al. | 363/21 |
| 5,117,347 | 5/1992 | Rebello et al. | 363/56 |
| 5,227,964 | 7/1993 | Furuhata | 363/56 |
| 5,267,133 | 11/1993 | Motomura et al. | 363/21 |
| 5,490,052 | 2/1996 | Yoshida et al. | 363/21 |
| 5,497,311 | 3/1996 | Hanawaka | 363/21 |

FOREIGN PATENT DOCUMENTS

| | | | |
|---|---|---|---|
| 0262820 | 4/1994 | European Pat. Off. | H02M 3/335 |
| 3537536 | 4/1987 | Germany | H02M 3/00 |
| 4001324 | 7/1991 | Germany | H02M 3/28 |
| 4001325 | 7/1991 | Germany | H02M 3/28 |
| 2050081 | 12/1980 | United Kingdom | H02M 3/24 |
| 1590966 | 6/1981 | United Kingdom | H04N 3/18 |
| 2081530 | 2/1982 | United Kingdom | H04N 3/18 |

OTHER PUBLICATIONS

JP 63-290166 (A), In: Patents Abstracts of Japan, Sect. E, Mar. 24, 1989, vol. 13 Nr. 121, (E-732).
JP 3-222671 (A), In: Patents Abstracts of Japan, Sect. E, Dec. 25, 1991, vol. 15 Nr. 510, (E-1149).
JP 3-159565 (A), In: Patents Abstracts of Japan, Sect. E, Oct. 8, 1991, vol. 15 Nr. 397, (E-1120).

*Primary Examiner*—Jeffrey L. Sterrett
*Attorney, Agent, or Firm*—Ostrolenk, Faber, Gerb & Soffen, LLP

[57] ABSTRACT

A resonance power circuit comprises: a transformer having a primary coil and a secondary coil; a driving power source connected to the primary coil; a single switching device for conducting an ON/OFF control of a current which flows through the primary coil; a resonance capacitor which cooperates with the primary coil for producing a series resonance to generate a voltage pulse when the switching device is in an OFF state; a detector connected to the secondary coil for detecting a high voltage output from the secondary coil; a control circuit for controlling an ON period of the switching device on the basis of the high voltage detected by the detector to control a peak level of the voltage pulse; a damper diode for allowing a reverse current to flow through the primary coil during a damper period; and a clamping circuit for clamping a voltage across both terminals of the resonance capacitor to a voltage of the driving power source during a period from an end of the damper period to a start of the ON period of the switching device.

26 Claims, 10 Drawing Sheets

FIG. 1
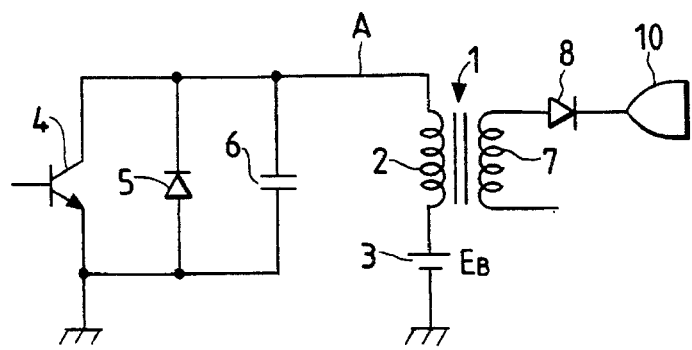
FIG. 2(a)
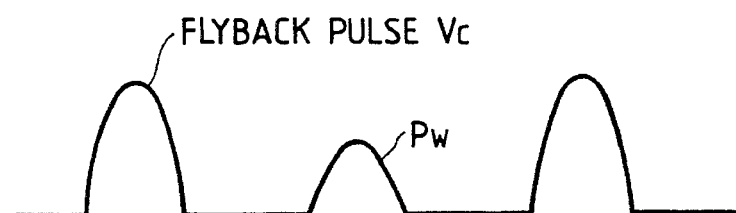
FIG. 2(b)
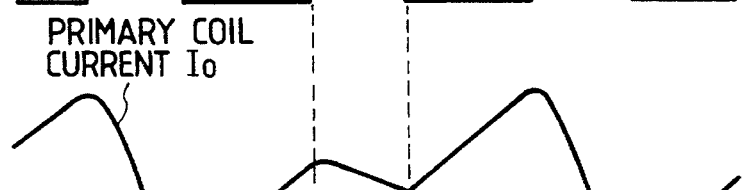
FIG. 2(c)
FIG. 2(d)
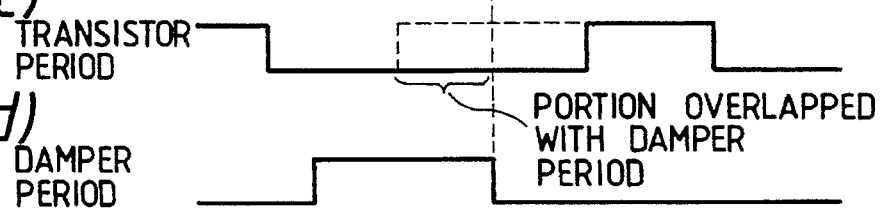

RESONANCE POWER CIRCUIT WITH CLAMPING CIRCUIT

This is a continuation of application Ser. No. 08/126,085 filed on Sep. 23, 1993, now abandoned.

BACKGROUND OF THE INVENTION

1. Field of the Invention

The invention relates to a resonance power circuit in which a voltage pulse is generated by the resonance operation on the primary side of a transformer and the voltage pulse is boosted by the transformer to be output from the secondary side thereof.

2. Discussion of the Related Art

A resonance power circuit used in a television receiver or a display device incorporates a stabilizing circuit for stabilizing a high output voltage (e.g. 30 kV) which is to be supplied from a flyback transformer to a cathode ray tube (CRT).

Stabilizing circuits for this purpose are classified into the type in which the voltage of a driving power source on the primary side of a flyback transformer is controlled, and the secondary control type in which a voltage for compensating a drop of a high output voltage is added to the secondary side of a flyback transformer.

However, a stabilizing circuit of the former type has a problem in that the response of the control is very poor, and that of the latter type has problems in that the correction range is narrow, and that a complex circuit is required.

In order to solve these problems as far as possible, recently, there has been proposed a system in which the primary current of a flyback transformer is directly controlled, in Japanese Patent Unexamined Publication (Kokai) No. Hei 2-222,374. According to the proposed system, the control range of a high output voltage can be widened. On the other hand, the proposed system requires a plurality of switching devices for controlling the primary current, and therefore has problems in that the number of parts is increased, and the circuit configuration is complicated. Moreover, the proposed system has further problems in that a circulating current flows uselessly to increase the power loss, and the switching operation of the switching devices during a scanning period causes noise.

The inventors have studied to a basic circuit of a resonance power circuit such as shown in FIG. 1, which is of the type wherein the primary current is directly controlled, and have vigorously labored to improve its circuit characteristics.

In FIG. 1, the positive terminal of a driving power source 3 is connected to one terminal of a primary coil 2 of a flyback transformer 1, and the negative terminal of the driving power source 3 is grounded. A transistor 4 which functions as a switching device is connected in series to the other terminal of the primary coil 2. A damper diode 5 and a resonance capacitor 6 are connected in parallel to the transistor 4, respectively.

The high voltage terminal of a secondary coil 7 of the flyback transformer 1 is connected to the anode of a CRT 10 through a high voltage rectifier diode 8.

In the circuit of this type, during the ON period (transistor period) of the transistor 4, a current shown in FIG. 2(b) flows from the driving power source 3 toward the transistor 4 through the primary coil 2, whereby an electromagnetic energy is accumulated in the primary coil 2. When the transistor 4 is then turned OFF, series resonance of the primary coil 2 and the resonance capacitor 6 starts so that the electromagnetic energy accumulated in the primary coil 2 is converted into an electrostatic energy of the resonance capacitor 6, thereby generating a flyback pulse (voltage pulse) as shown in FIG. 2(a). The flyback pulse has a peak value when all the electromagnetic energy accumulated in the primary coil 2 has been converted into the electrostatic energy of the resonance capacitor 6.

After the flyback pulse reaches the peak, the electrostatic energy of the resonance capacitor 6 is inversely converted into the electromagnetic energy of the primary coil 2, resulting in that the level of the flyback pulse gradually decreases. When the level of the pulse reaches zero, that is, the voltage of the point A of the circuit of FIG. 1 becomes zero, the damper diode 5 is rendered conductive so that a reverse current flows from the ground toward the primary coil 2. As a result, when the voltage of the point A returns to the power source voltage of the driving power source 3, the damper diode 5 becomes nonconductive. When the transistor 4 is again turned ON, the circuit returns to the initial operation state. The circuit continues to operate while repeating these operations. The flyback pulse generated in the side of the primary coil 2 is boosted by the flyback transformer 1 and then supplied to the anode of the CRT 10 through the high voltage rectifier diode 8.

The pulse voltage $V_c$ of the flyback pulse generated on the primary side of the flyback transformer 1 is indicated by an expression of $V_c = E_B + r_a \sin(\omega t - \phi_a)$ where t is the time, $E_B$ is the power source voltage of the driving power source 3, and $r_a$, $\omega$, and $\phi_a$ are indicated respectively as follows:

$$r_a = \{E_B^2 + (I_0/C\omega)^2\}^{-\frac{1}{2}}$$

$$\omega = (LC)^{-\frac{1}{2}}$$

$$\omega_a = \tan^{-1}(E_B C\omega/I_0)$$

In the above expressions, $I_0$ is the current flowing through the primary coil 2, C is the capacitance of the resonance capacitor 6, and L is the inductance of the primary coil 2.

As seen from the expression of $V_c$, the level of the flyback pulse has a peak when $\omega t - \phi_a = \pi/2$. At this time, the peak voltage is $V_c = E_B + \{E_B^2 + (I_0/C\omega)^2\}^{-\frac{1}{2}}$.

The current $I_0$ flowing through the primary coil 2 is indicated by $I_0 = (E_B/L)t_{on}$, where $t_{on}$ is the period during which the transistor 4 is ON. That is, $I_0$ is proportional to the ON period of the transistor 4. Therefore, the peak or high value of the flyback pulse can be varied by controlling the ON period of the transistor 4, thereby enabling the high output voltage of the secondary coil 7 to be stabilized.

In this way, when the high output voltage is to be stabilized by controlling the ON period of the transistor 4 in the circuit of FIG. 1 as it is, a reverse current flows from the ground toward the primary coil 2 through the damper diode 5 during the damper period (ON period of the damper diode 5). When this flow of the reverse current makes the voltage of the point A return to the power source voltage and the damper diode 5 is rendered nonconductive, the current supplied from the driving power source 3 toward the primary coil 2 begins to flow through the resonance capacitor 6 toward the ground because the transistor 4 has already been turned OFF. This causes series resonance to occur in the primary coil 2 and the resonance capacitor 6, whereby, as shown in FIG. 2(a), a useless pulse $P_W$ is generated in the period from the end of the damper period to the subsequent ON state of the transistor 4.

The pulse $P_W$ causes a noise to be generated so as to adversely affect the circuit operation. Accordingly, the circuit of this type is so organized that a current flow from the primary coil 2 to the resonance capacitor 6 is prevented from occurring in the end portion of the damper period. More specifically, a switching device for interrupting the current is connected in the path from the driving power source 3 to the ground through the primary coil 2 and the resonance capacitor 6 or the transistor 4. Alternatively, the starting portion of the ON period of the transistor 4 is set to overlap with the end portion of the damper period (FIG. 2(d)) as indicated by a broken line in FIG. 2(c), so that the current from the side of the driving power source 3 flows toward the transistor 4.

Since the ON period of the transistor 4 overlaps with the damper period, however, the transistor 4 cannot control the output on the basis of the timing of the ON operation. In a circuit which provides a switching device for interrupting the current in the path from the driving power source 3 to the ground through the primary coil 2 and the resonance capacitor 6 or the transistor 4, the switching device must be provided separately from the transistor 4 in order to block the current, and a control circuit for controlling the operation timing of the switching device is further required. This increases the number of parts and makes the circuit configuration complex, thereby producing a problem in that the cost of such a circuit is high.

SUMMARY OF THE INVENTION

The present invention has been conducted in order to solve the above-mentioned problems, and it is an object of the invention to provide a resonance power circuit in which the level of a voltage pulse generated on the primary side can be controlled only by controlling a single switching device, a useless pulse is prevented from being generated during the period from the end of the damper period to the ON period of a transistor, the number of parts is reduced, the circuit configuration is simple, and there is no power loss due to a circulating current flowing on the primary side.

In order to attain the object, the resonance power circuit of the invention comprises: a transformer having a primary coil and a secondary coil; a driving power source connected to said primary coil of said transformer; a switching device for conducting an ON/OFF control of a current which flows through said primary coil; a resonance capacitor which cooperates with said primary coil for producing a series resonance to generate a voltage pulse when said switching device is in an OFF period; detection means connected to said secondary coil of said transformer for detecting a voltage output from said secondary coil; control means for controlling an ON period of said switching device on the basis of the voltage detected by said detection means to control a peak level of said voltage pulse; and a clamping circuit for clamping a voltage across both terminals of said resonance capacitor to a voltage of said driving power source during a period from an end of a damper period to a start of the ON period of said switching device.

In the resonance power circuit of the invention, when the switching device is turned ON, a current flows from the driving power source through the primary coil and the switching device, so that an electromagnetic energy is accumulated in the primary coil. When the switching device is turned OFF, a voltage pulse is generated owing to the series resonance of the resonance capacitor and the primary coil. When the generation of the voltage pulse is completed, the damper period starts and the reverse current flows from the damper diode side toward the primary coil. After the damper diode is rendered nonconductive at the end of the damper period, the clamping circuit clamps the voltage across the both terminals of the resonance capacitor to the voltage of the driving power source. This clamping operation causes the power source and the both terminals of the resonance capacitor to have the same potential. Accordingly, a current is inhibited from flowing from the power source side to the resonance capacitor side through the primary coil, a circuit loss due to a useless circulating current is prevented from being produced during the period from the end of the damper period to the next turn ON of the switching device, and the generation of a useless voltage pulse which causes a noise is eliminated. When the switching device is turned ON under the state where the clamping circuit operates, a current flows from the power source side to the switching device side through the primary coil, so that the circuit of the invention returns to the initial operation state, and the circuit is kept to operate.

During the period from the end of the damper period to the time when the switching is turned ON, the voltage of the both terminals of the resonance capacitor are clamped to the power source voltage of the driving power source. Therefore, a current is inhibited from flowing from the driving power source to the resonance capacitor through the primary coil, whereby a useless voltage pulse $P_W$ which causes a noise is prevented from being generated.

Furthermore, the clamping circuit which prevents the voltage pulse $P_W$ from being generated has a very simple circuit configuration where only the two diodes are used or a diode and a transistor are used, and does not require a switching device for blocking the current flow and a complex circuit for controlling the switching device.

Furthermore, since the useless voltage pulse $P_W$ is prevented from being generated by the clamping circuit, the circuit control is free from the above-mentioned restriction that the ON period of the switching device must overlap with the damper period. This allows the pulse width of the drive signal for switching the switching device, to be widened at the maximum to the width of the horizontal drive signal, so that the voltage can be controlled in a very wide range.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings, FIG. 1 is a basic circuit showing a conventional resonance power circuit;

FIGS. 2(a) to 2(d) are time charts representative of the circuit operation of FIG. 1;

DETAILED DESCRIPTION OF THE PREFERRED EMBODIMENTS

Figure 3:
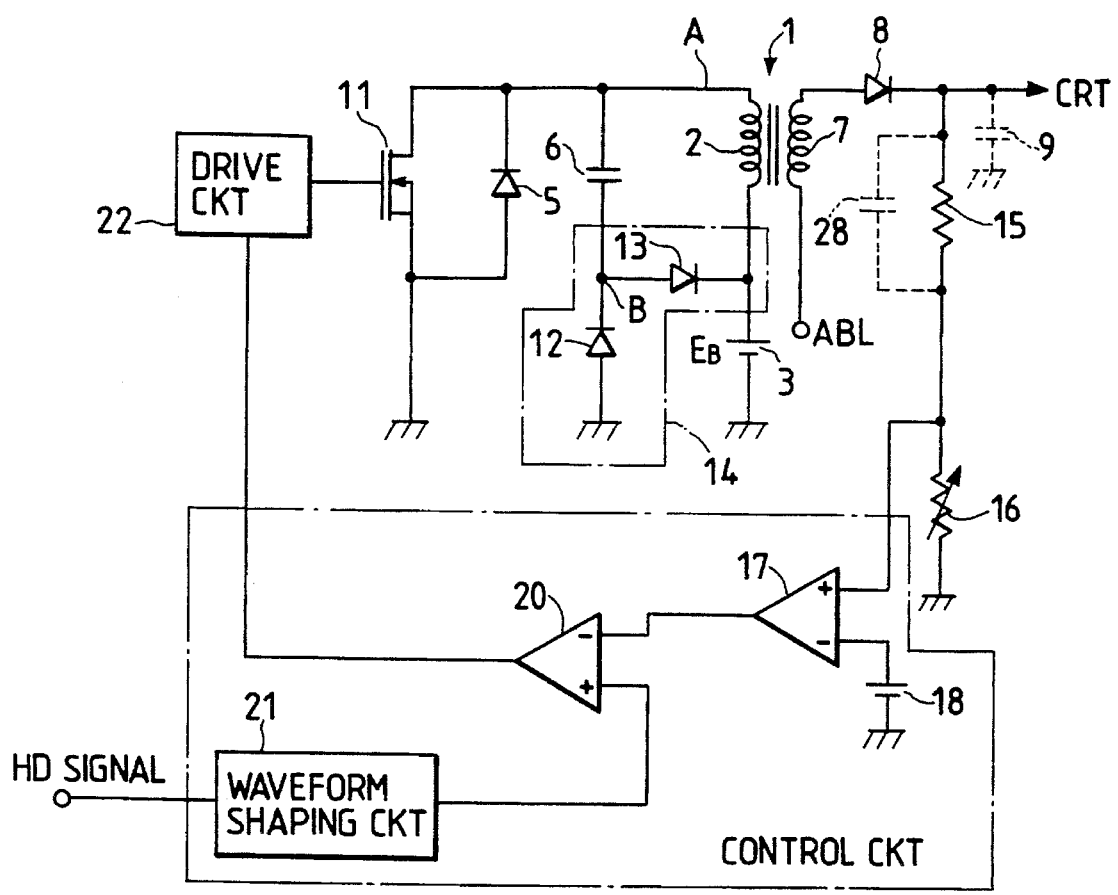
FIG. 3 is a circuit diagram showing a first embodiment of the invention.

Hereinafter, embodiments of the invention will be described with reference to the drawings. In the following description of the embodiments, the same circuit portions as those of the above-described basic circuit are designated by the identical reference numerals, and their description is omitted.

FIG. 3 shows the circuit configuration of the resonance power circuit according to a first embodiment of the invention. In FIG. 3, a driving power source 3 is connected to one terminal (e.g., the winding start terminal) of a primary coil 2 of a flyback transformer 1, and the drain of a MOSFET (field effect transistor) 11 which functions as the switching device is connected to the other end (e.g., the winding end terminal) of the primary coil 2. The source of the MOSFET 11 is grounded. A damper diode 5 which is oppositely directed with respect to the current flow direction of the MOSFET 11 is connected in parallel to the MOSFET 11. The damper diode 5 may be realized by externally connecting a diode which is a discrete electronic component to the switching device. When the MOSFET 11 is used as the switching device, the external diode component can be omitted because the MOSFET 11 itself has the backward diode characteristic. In this case, the diode characteristic of the MOSFET 11 can function as the damper diode 5.

One terminal of a resonance capacitor 6 is connected to the winding end terminal of the primary coil 2, and the other terminal of the resonance capacitor 6 is connected to the cathode of a diode 12. The anode of the diode 12 is grounded. The anode of a diode 13 is connected to the node of the diode 12 and the resonance capacitor 6, and the cathode of the diode 13 is connected to the node of the primary coil 2 and the driving power source 3. The diodes 12 and 13 constitute a clamping circuit 14 which is characteristic of the embodiment.

One end of a series circuit of potential dividing resistors 15 and 16 is connected to the high voltage terminal of a secondary coil 7 of the flyback transformer 1 so that the high output voltage is potentially divided by the resistors 15 and 16 to be detected. The detected voltage is supplied to the non-inverting input of an operational amplifier 17. To the inverting input of the operational amplifier 17, supplied is a reference voltage from a reference voltage source 18. The operational amplifier 17 compares the detected value of the high output voltage with the reference voltage, and supplies a signal indicative of the dropping amount of the high output voltage, to the inverting input of a comparator 20. A signal from a waveform shaping circuit 21 is supplied to the non-inverting input of the comparator 20.

Figure 4:
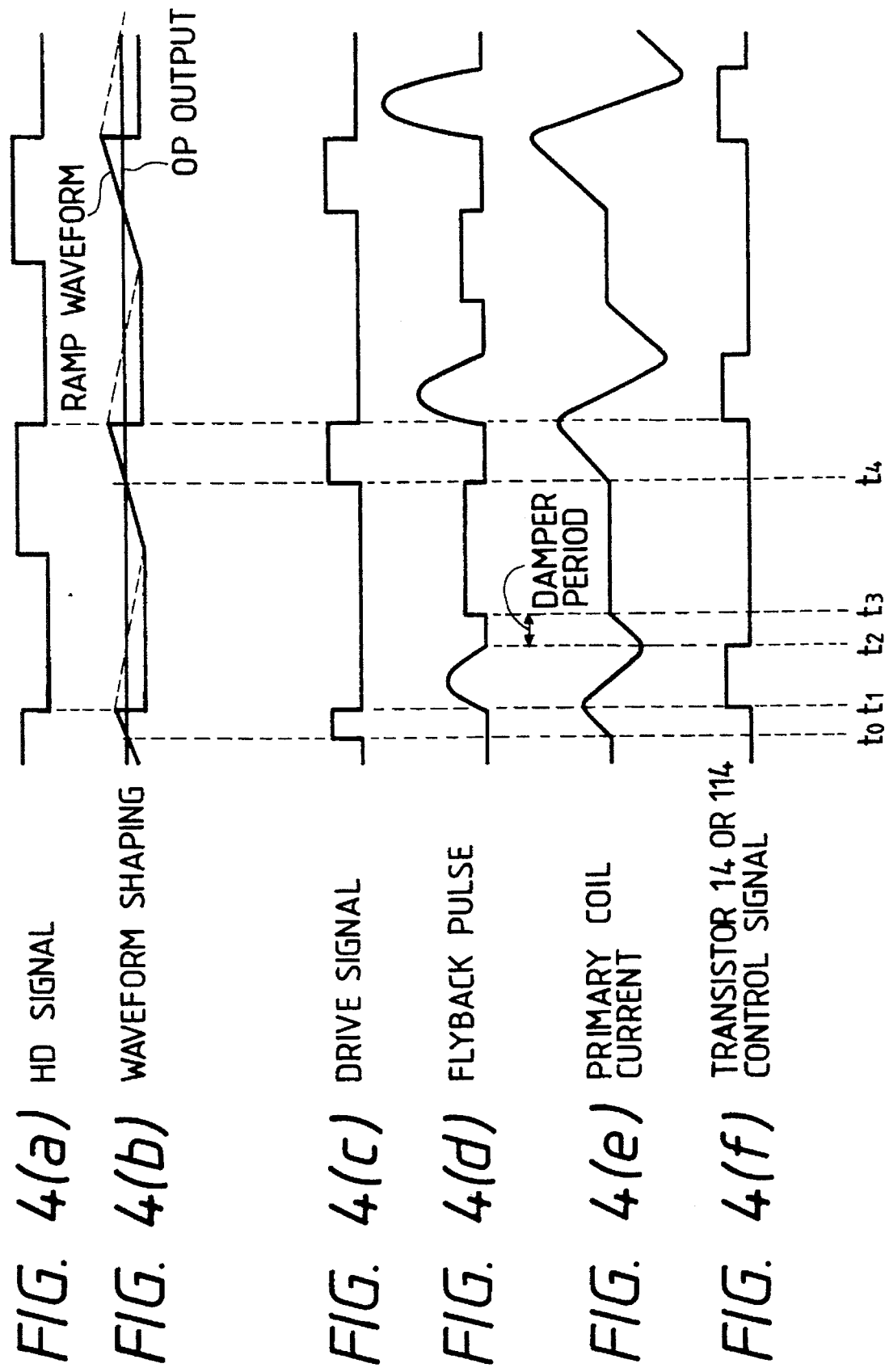
FIGS. 4(a) to 4(f) are time charts showing the circuit operation of the invention.

The waveform shaping circuit 21 integrates a horizontal drive signal (HD signal) shown in FIG. 4(a), which is synchronous with a horizontal deflection output circuit (not shown) to generate a ramp waveform as shown in FIG. 4(b). The signal of the ramp waveform is supplied to the non-inverting input of the comparator 20. The comparator 20 compares the signal of the ramp waveform with the signal from the operational amplifier 17, and generates a drive signal which, as shown in FIGS. 4(b) and 4(c), rises at the intersection of the output of the operational amplifier 17 and the ramp waveform and falls at the falling edge of the ramp waveform, that is, at the falling edge of the HD signal. As the dropping amount of the high output voltage increases, the output level of the operational amplifier 17 is lowered, resulting in that the pulse width of the drive signal is widened. In other words, the comparator 20 generates a drive signal having a pulse width which becomes wider as the dropping amount of the high output voltage increases. The generated drive signal is supplied to a drive circuit 22. In accordance with the on-pulse width of the drive signal, the drive circuit 22 conducts the switching operation of the MOSFET 11.

Next, the operation of the resonance power circuit thus organized will be described with reference to the circuit diagram of FIG. 3 and the time charts of FIGS. 4(a) to 4(e).

First, the MOSFET 11 is turned ON at time $t_0$, so that a current flows from the driving power source 3 through the primary coil 2 and the MOSFET 11 to the ground. The current passing through the primary coil 2 increases as the time elapses as shown in FIG. 4(e), and causes an electromagnetic energy to be accumulated in the primary coil 2.

Then, the MOSFET 11 is turned OFF at time $t_1$, and a current flows from the primary coil 2 along the route passing through the resonance capacitor 6 and the diode 13. This causes the LC series resonance of the inductance of the primary coil 2 and the capacitance of the resonance capacitor 6 to start, thereby generating a flyback pulse (voltage pulse). The flyback pulse has a peak value when all the electromagnetic energy accumulated in the primary coil 2 has been converted into the electrostatic energy of the resonance capacitor 6. After all the electromagnetic energy accumulated in the primary coil 2 has been transferred to the resonance capacitor 6, a reverse current flows along the route lying through the diode 12, the resonance capacitor 6, and the primary coil 2 in this sequence and reaching the driving power source 3. Then, the electrostatic energy of the resonance capacitor 6 is gradually inversely converted into an electromagnetic energy of the primary coil 2.

When the generation of the flyback pulse is completed at time $t_2$, the voltage of the point A of the circuit of FIG. 3 becomes zero. At this time, the damper diode 5 is rendered conductive so that a current flows from the ground toward the primary coil 2 through the damper diode 5. The reverse current flow causes the voltage of the point A to rise. When the voltage of the point A reaches at time $t_3$ the same level as that of the power source voltage $E_B$ of the driving power source 3, the damper diode 5 is rendered nonconductive. Since the MOSFET 11 is OFF at this time, a current is disposed to flow from the driving power source 3 toward the resonance capacitor 6. In the embodiment, however, the clamping circuit 14 consisting of the diodes 12 and 13 clamps the voltages of the both terminals of the resonance capacitor 6 (i.e., the voltages of the points A and B) to the power source voltage $E_B$ of the driving power source 3, so that they are at the same level as that of the voltage $E_B$. Therefore, a current is inhibited from flowing from the primary coil 2 toward the resonance capacitor 6, whereby a useless voltage pulse $P_W$ as shown in FIG. 2(a) which causes a noise is prevented from being generated.

Then, when the MOSFET 11 is turned ON at time $t_4$, the point A is grounded so that a current which flows from the driving power source 3 and passes through the primary coil 2 further flows toward the ground through the MOSFET 11, so that the circuit of the embodiment returns to the initial operation state obtained at time $t_0$. By repeating the operations from $t_0$ to $t_4$, the circuit is kept to operate.

In the embodiment, the ON period of the MOSFET 11 is lengthened as the high output voltage decreases in level. The lengthened ON period increases the electromagnetic energy accumulated in the primary coil 2 so that also the peak or high value of the generated flyback pulse is increased, resulting in that the high output voltage can effectively be stabilized. Since the switching device for controlling the high output voltage is configured by a single MOSFET, moreover, the number of parts is very small, and the circuit configuration is simple.

During the period from the end of the damper period to the time when the MOS FET 11 is turned ON, the voltages of the both terminals of the resonance capacitor 6 are clamped to the power source voltage of the driving power source 3. Therefore, a current is inhibited from flowing from the driving power source 3 to the resonance capacitor 6 through the primary coil 2, whereby a useless voltage pulse $P_W$ which causes a noise is prevented from being generated. Since a circulating current does not flow, moreover, there is no power loss (circuit loss) due to the circulating current, and therefore the efficiency of driving the circuit can be enhanced.

Furthermore, the clamping circuit 14 which prevents the voltage pulse $P_W$ from being generated has a very simple circuit configuration where only the two diodes 12 and 13 are used, and does not require a switching device for blocking the current flow and a complex circuit for controlling the switching device.

In the embodiment, the useless voltage pulse $P_W$ is prevented from being generated by the clamping circuit 14. Therefore, the embodiment is free from the above-mentioned restriction that the ON period of the MOSFET 11 must overlap with the damper period as indicated by the broken line in FIG. 2(c). This allows the pulse width of the drive signal for switching the MOSFET 11, to be widened at the maximum to the width of the horizontal drive signal, so that the voltage can be controlled in a very wide range.

Furthermore, since the circuit of the embodiment is a resonance type circuit which conducts charging and discharging operations every one deflection cycle, it has a very excellent response to the stabilizing of the high output voltage, so that the control performance of stabilizing the high output voltage is remarkably enhanced.

Figure 5:
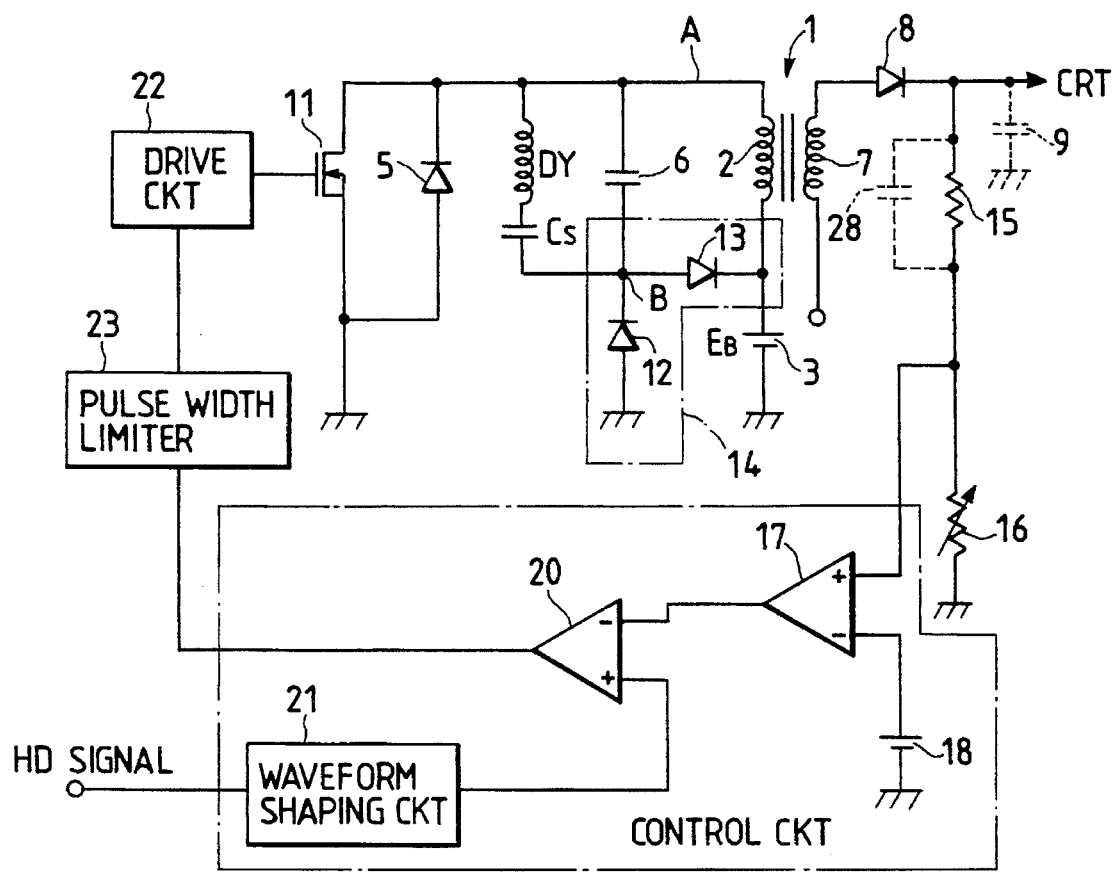
FIG. 5 is a circuit diagram showing a second embodiment of the invention.

FIG. 5 shows a resonance power circuit according to a second embodiment of the invention. In the embodiment, a series circuit of a deflection yoke $D_Y$ and an S-shape-correction capacitor $C_s$ is connected in parallel to the resonance capacitor 6, so as to realize a circuit configuration in which both the high voltage generation and the deflection driving are conducted. Further, a pulse-width limiter 23 is connected between the comparator 20 and the drive circuit 22. The other configuration of the embodiment is the same as that of the first embodiment.

Generally, in a multiscan type circuit which can conduct the deflection driving in a wide range from a low frequency to a high frequency, the upper limit of the peak value of a flyback pulse is preset in the design process so as to be a voltage at which the deflection frequency is high. The circuit of the embodiment has a configuration in which the pulse width of the drive signal can be widened at the maximum to the width of the horizontal drive signal. In the multiscan driving, when the pulse width of the drive signal is fully widened to the width of the HD signal, therefore, the ON period of the MOSFET 11 in the case of the low-frequency driving is longer than that in the case of the high-frequency driving, so that also the current flowing through the primary coil 2 becomes large. As a result, the generated flyback pulse is very higher in peak value than that generated in the case of the high-frequency driving, thereby producing a problem in that the peak value of the flyback pulse exceeds the above-mentioned upper limit of the peak value of a flyback pulse or the designed upper limit. In order to prevent such a phenomenon from occurring, the embodiment is provided with the pulse-width limiter 23. The pulse-width limiter 23 controls the pulse width of the drive signal so that, even in the case of the low-frequency deflection driving, it does not exceed the upper limit which is preset based on the high-frequency driving. This allows the multiscan driving in a wide frequency range from a low frequency to a high frequency, to be conducted smoothly.

Figure 6:
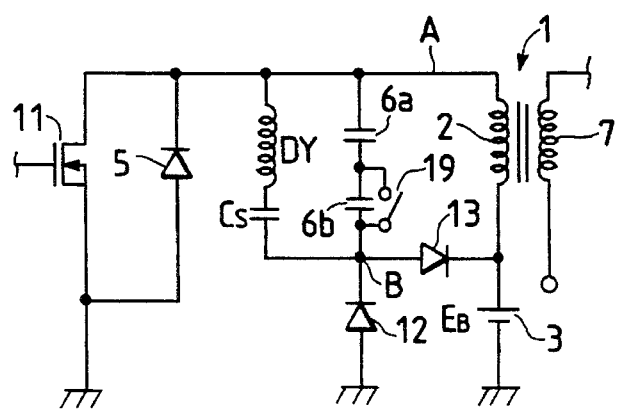
FIG. 6 is a circuit diagram of a modified embodiment which is provided with an element for switching the resonance capacity.

As shown in an alternative circuit for the multiscan driving of FIG. 6, the resonance capacitor 6 may be composed of a series circuit of capacitors 6a and 6b, and the resonance capacity may being changed over by a switch 19 depending on the type of the driving, namely, the low-frequency driving or the high-frequency driving.

Figure 7:
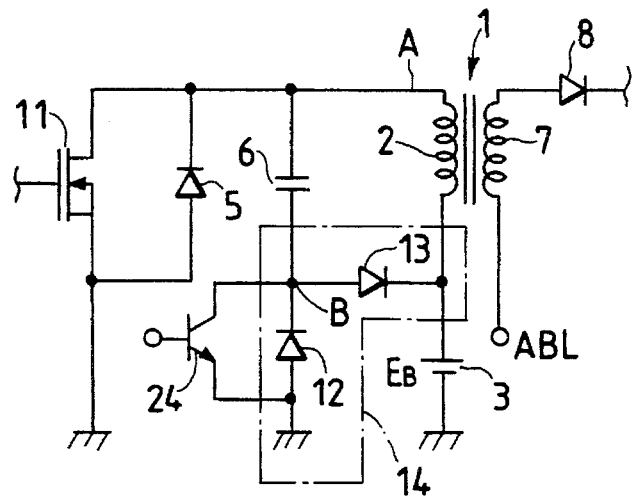
FIG. 7 is a circuit diagram showing a third embodiment of the invention.
Figures 8A, 8B:
FIGS. 8(a) and 8(b) are the flyback pulse waveform obtained by the circuit of the invention, respectively.

FIG. 7 shows a third embodiment of the invention. The embodiment is characterized in that a transistor 24, which functions as the switching device is connected in parallel to the diode 12 of the clamping circuit 14. The other configuration of the embodiment is the same as that of the first embodiment. The waveform of the flyback pulse in the first and second embodiments is exaggeratingly shown in FIG. 8(a). In the first and second embodiments, when the MOSFET 11 is turned OFF and a current flows due to the LC series resonance from the driving power source 3 to the resonance capacitor 6 through the primary coil 2, the current cannot flow toward the ground because the diode 12 is reversely directed. Accordingly, the flyback pulse has a waveform in which the peak is raised by the value of the power source voltage $E_B$ of the driving power source 3, from the peak value obtained in a circuit without the diode 12, resulting in that the waveform of the pulse is laterally asymmetric. In order to prevent such a phenomenon from occurring, in the embodiment, the transistor 24 is connected in parallel to the diode 12, and the transistor 24 is turned ON during the period of generation of the flyback pulse. A control signal having a pulse width identical with the flyback period as shown in FIG. 4(f) is supplied to the transistor 24. The ON state of the transistor 24 allows the current flowing from the primary coil 2 through the resonance capacitor 6 to further flows via the transistor 24 to the ground. This prevents the peak voltage of the flyback pulse from being raised by the value of the power source voltage $E_B$ of the driving power source 3, thereby enabling the flyback pulse to have a waveform which is laterally symmetric as shown in FIG. 8(b).

Figure 9:
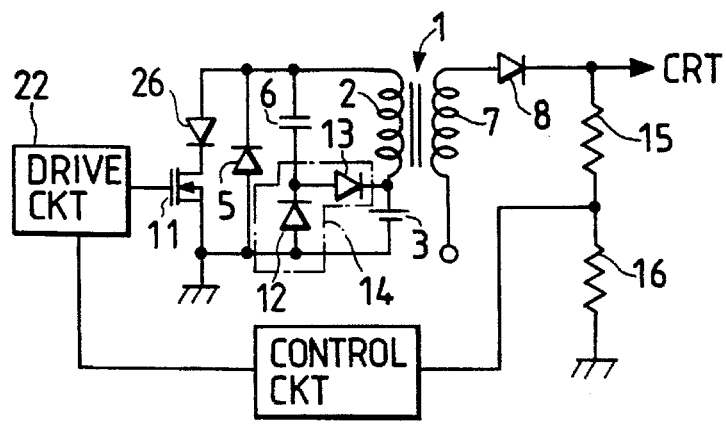
FIG. 9 is a circuit diagram showing a fourth embodiment of the invention.
Figure 10:
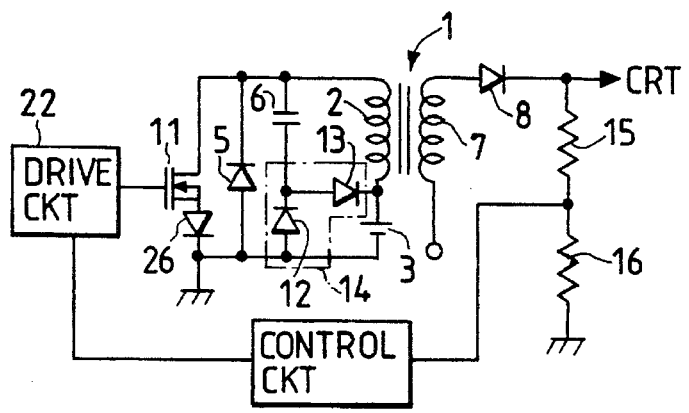
FIG. 10 is a circuit diagram showing a fifth embodiment of the invention.

FIGS. 9 and 10 show fourth and fifth embodiments of the invention, respectively. In the fourth embodiment of FIG. 9, a diode 26 is connected to the drain of the MOSFET 11. The parasitic capacity between the source and drain of the MOSFET 11 acts as a part of the resonance capacity of the flyback pulse. However, this resonance capacity allows a resonance to newly occur between the MOSFET 11 and the primary coil 2 during a period from the end of the damper period to the time when the transistor is subsequently turned on, resulting in an oscillatory noise. This resonance makes it difficult to control a high voltage output at the secondary coil in a substantially linear manner. However, the diode 26, which is connected in series to the MOSFET 11 in this embodiment, can reduce the resonance capacity caused by the MOSFET 11.

In contrast, the circuit in the fifth embodiment of FIG. 10 is so configured that the diode 26 is connected to the source of the MOSFET 11 so as to provide the same effect as that in FIG. 9. The other configuration of the embodiments is the same as that of the first embodiment. The second and third embodiments may be modified so that the diode 26 is connected to the drain or source of the MOSFET 11.

Figure 11:
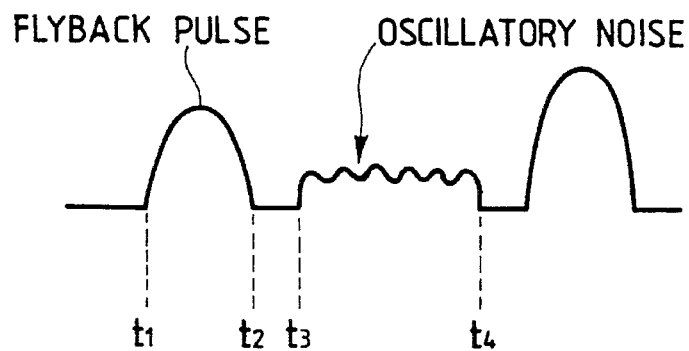
FIG. 11 is a waveform of an oscillatory noise which is generated during the period from the end of the damper period to the subsequent ON state.

In the operation of the circuit of each of the embodiments, during the period from the end of the damper period to the time when the MOSFET 11 is subsequently turned ON, the current disposed to flow from the driving power source 3 through the primary coil 2 is blocked from exiting by the clamping operation of the clamping circuit 14. Owing to the parasitic capacity of the MOSFET 11 or the like, accordingly, an oscillatory noise is generated at the point A, etc. of the circuit in the period from $t_3$ to $t_4$ as shown in FIG. 11. When the CRT is driven by the low-frequency driving, this noise does not constitute a hindrance which may adversely affect the operation of the circuit. In contrast, when the CRT is driven by the high-frequency driving, there are cases where this noise causes a damage. In the fourth and fifth embodiments, the diode 26 is connected in series to the drain or source of the MOSFET 11, whereby the oscillatory noise in the period from $t_3$ to $t_4$ can be eliminated.

Figure 12A:
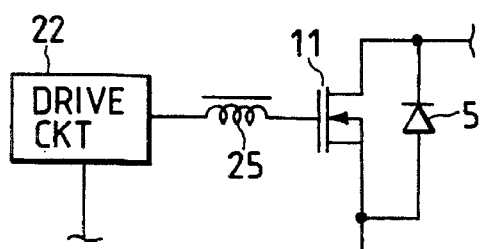
FIGS. 12(a) and 12(b) are circuit diagrams illustrating various circuits for eliminating an oscillatory noise, respectively.
Figure 12B:
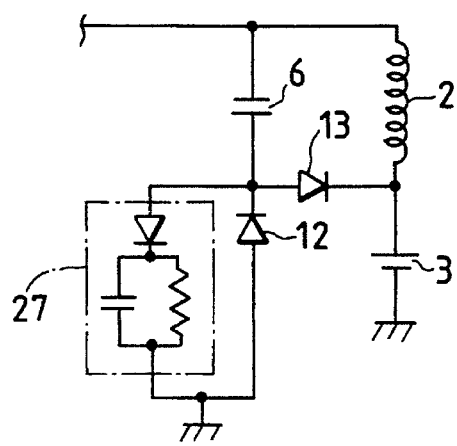

Alternatively, the circuit configuration for eliminating the oscillatory noise in the period from $t_3$ to $t_4$ may be realized, for example, by connecting a saturable core 25 to an adequate position such as the gate of the MOSFET 11 as shown in FIG. 12(a), or by connecting a snubber circuit 27 in parallel to the diode 12 as shown in FIG. 12(b).

In the embodiments described above, the clamping circuit 14 consisting of the diodes 12 and 13 is provided, or the diode 26 is additionally connected in series to the MOSFET 11. Particularly in the case of the high-frequency driving, the provision of the diodes 12, 13 and 26 produces a characteristic feature that the secondary output $H_V$ of the flyback transformer 1 can be controlled linearly by controlling the ON period of the MOSFET 11, that is, the width of the ON-pulse for the MOSFET 11.

Figure 13:
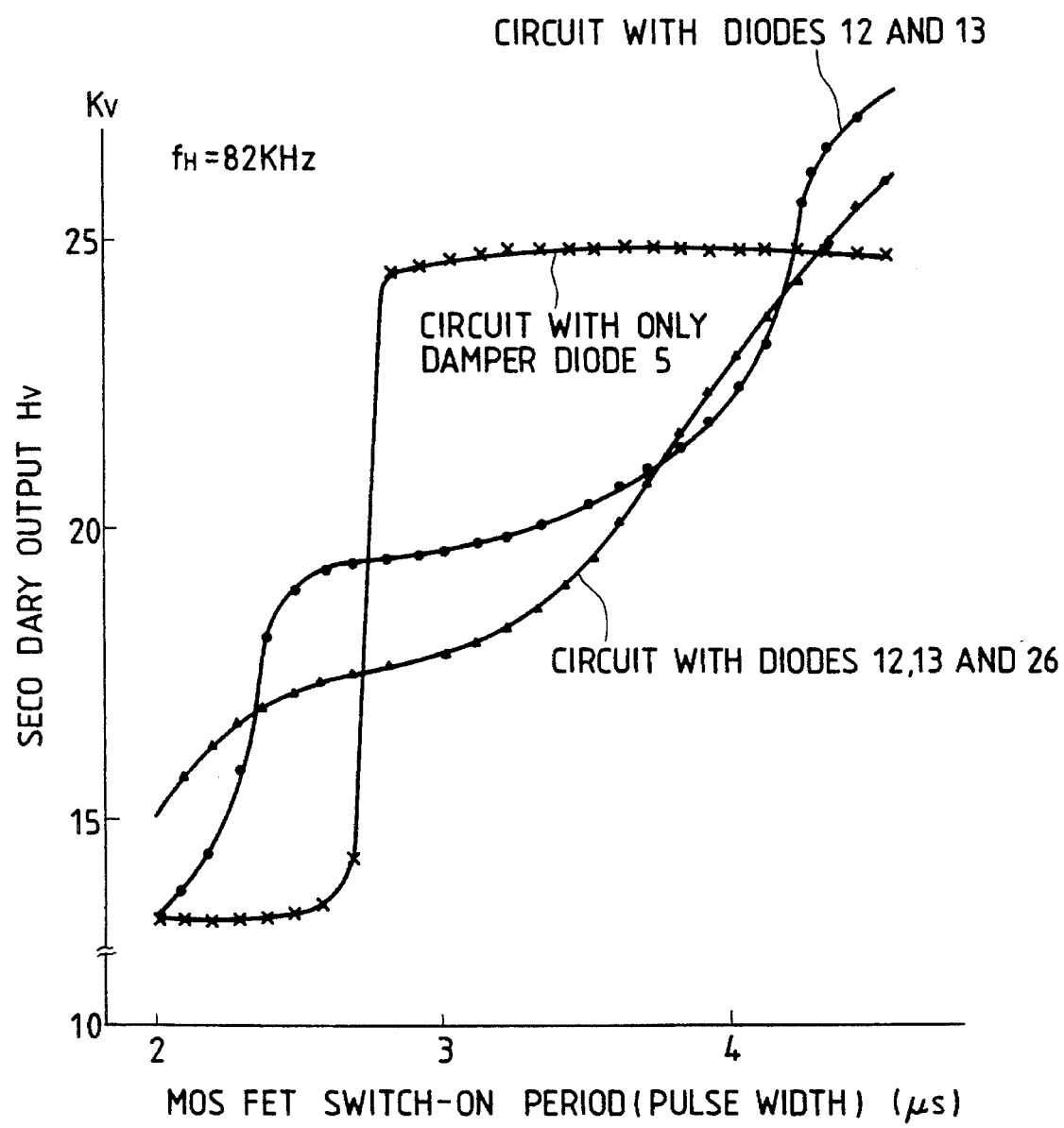
FIG. 13 is a graph showing experimental results of a relationship between a MOSFET switch-ON period and a secondary output.

FIG. 13 is a graph showing experimental results for confirming this effect. As seen from the graph, in a circuit such as the basic circuit of FIG. 1 which comprises a single diode or the damper diode 5, the secondary output $H_V$ steeply rises during a very narrow range of the switch ON period. During such a narrow range, it is difficult to finely control the switch ON period. Moreover, in each of the both side regions of the steep rising, the secondary output has the substantially same value even when the switch ON period of the MOSFET 11 is varied, resulting in that it is impossible to linearly control the secondary output. In the basic circuit of FIG. 1, therefore, the secondary output cannot be controlled even when the ON period of the transistor 4 which is the main switch corresponding to the MOSFET 11 of the above-described embodiments is controlled. Accordingly, it is entirely unforeseen that, in a prior art circuit such as the basic circuit of FIG. 1, the secondary output $H_V$ is controlled by controlling the width of the ON-pulse for the transistor 4.

By contrast, in the circuit of the first embodiment which is provided with the diodes 12 and 13 of the clamping circuit 14, the secondary output $H_V$ is changed during a considerably wide range of the switch ON period. In the circuits of the fourth and fifth embodiments which are provided with the diode 26 in addition to the diodes 12 and 13 of the clamping circuit 14, it is possible to linearly change the secondary output $H_V$ during the wide range of the switch ON period. As apparent from these experimental results, the provision of both of the diodes 12 and 13 of the clamping circuit 14 and the diode 26 connected in series to the MOSFET 11 produces an outstanding effect that the secondary output $H_V$ can linearly be controlled only by controlling the ON period of the sole switching device, which is the MOSFET 11.

This outstanding effect is produced because of the reason described below. In the basic circuit of FIG. 1 which is provided with the sole damper diode 5, when the transistor 4 is turned ON, a current flows from the driving power source 3 to the primary coil 2 to accumulate an electromagnetic energy in the primary coil 2. When the transistor 4 is then turned OFF, the electromagnetic energy flows into the resonance capacitor 6 to start a free oscillation due to the LC series resonance. However, the damper diode 5 operates so that, when the counter electromotive force of the coil 2 exceeds the power source voltage $E_B$ of the driving power source 3, the damper current flows, thereby preventing the voltage pulse shown in FIG. 2(a) from dropping below the ground level. On the other hand, the peak value of the flyback pulse $V_c$ is proportional to the coil current $I_0$ of the coil 2 which is obtained when the transistor 4 is turned OFF.

As described above, when the initial current obtained when the transistor 4 is turned ON is indicated by $I_1$, the coil current $I_0$ is shown by the expression of $I_0=(E_B/L)t_{on}+I_1$, where L is the inductance of the coil 2 and $t_{on}$ is the ON period of the transistor 4. When considering only this, the secondary output $H_V$ can be controlled linearly by controlling the ON period of the transistor 4. Even if the transistor 4 is turned ON during the damper period, however, the transistor current does not flow in an actual case. Therefore, the state where the secondary output is constant and cannot be controlled remains until the damper period is terminated. As shown in FIG. 13, in the circuit which is provided with the sole damper diode 5, the level of the free oscillation is high and there exist a plurality of damper periods, resulting in that the range where the secondary output is variable is narrow. It is practically difficult to linearly control the secondary output in accordance with the ON period of the transistor 4.

By contrast, in the circuit of the embodiment which is provided with the clamping circuit 14 of the diodes 12 and 13, the voltage across the both terminals of the resonance capacitor 6 is clamped to the power source voltage $E_B$ by the clamping circuit 14. This prevents a free oscillation from occurring, thereby inhibiting the generation of the useless pulse $P_W$. Accordingly, the secondary output can freely be changed by controlling the switch ON period of the MOSFET 11.

Figure 14:
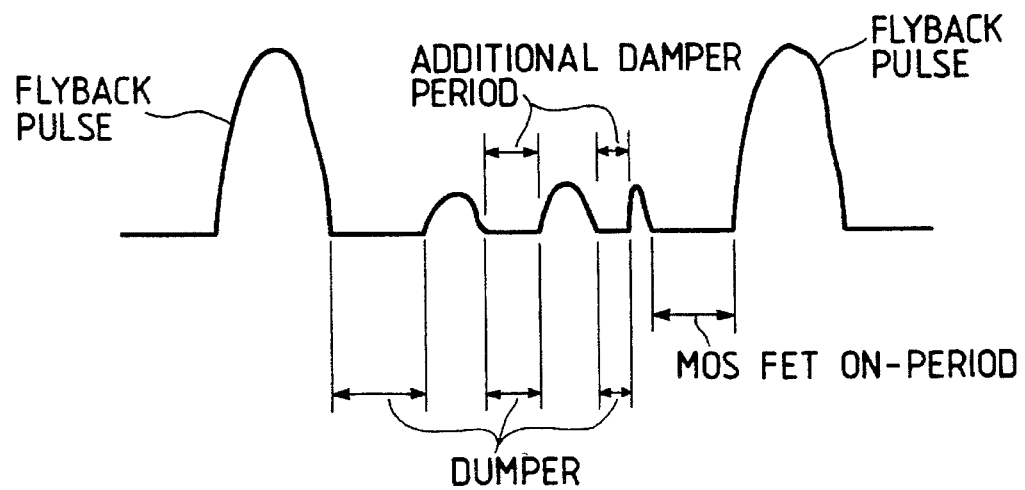
FIG. 14 is a waveform of flyback pulses between which damper periods are produced again.

Actually, however, the distributed capacity of the flyback transformer 1 and the parasitic capacity of the MOSFET 11 function in the same manner as the resonance capacitor 6. When these capacities are large, therefore, the free oscillation due to the capacities and the inductance of the coil 2 causes a reverse bias which is greater in level than the power source voltage $E_B$ of the driving power source 3, so that the damper period may be produced again during the scanning period, as shown in FIG. 14. If this additional damper period overlaps with the ON period of the MOSFET 11, the secondary output $H_V$ cannot be controlled during the overlap period.

In the case where the MOSFET 11 is turned ON at a time corresponding to the summit portion of a pulse during the scanning period, the current $I_0$ flowing through the coil 2 changes in level, and also the damper current which is equivalent to the current changes, whereby the OFF point of the damper is changed to cause an oscillation state. In order to comply with this phenomenon, it is required to reduce the parasitic capacity and the distributed capacity of the flyback transformer 1 so as to suppress the generation of an oscillating current. The distributed capacity of the flyback transformer 1 depends on the structure of the transformer itself. In the embodiment, therefore, the diode 26 is connected in series to the MOSFET 11 so that the parasitic capacity of the MOSFET 11 is reduced. This reduced capacity and the clamping effect of the clamping circuit 14 of the diodes 12 and 13 cooperate to enable the secondary output $H_V$ to be controlled in a substantially linear manner by controlling the switch ON period of the MOSFET 11, as shown in FIG. 13.

The invention is not restricted to the embodiments described above, and may be executed in various manners. For example, the circuits of the embodiments may be modified so that, as indicated by broken lines in FIG. 3, a smoothing capacitor 9 is disposed in the high voltage terminal side of the secondary coil 7 or a speed-up capacitor 28 for improving the response to the stabilizing of the high output voltage is disposed. Since the circuits of the embodiments have a wide control range of the stabilizing of the high output voltage and are excellent in response, it is generally unnecessary to connect a choke coil for improving the regulation in parallel to the primary coil of the flyback transformer 1. Of course, such a choke coil may be connected in parallel to the primary coil 2.

In the embodiments, in order to obtain a high output voltage, the series circuit of the potential dividing resistors 15 and 16 is connected to one terminal of the secondary coil 7. In a usual high voltage generation circuit, a resistor circuit for obtaining focus and screen voltages is connected to the secondary coil side, and therefore the detection of the high output voltage may be conducted using the resistor circuit.

In the embodiments, the high output voltage is stabilized by means of a switching control of the MOSFET 11. Alternatively, in the same manner as a conventional circuit, the high output voltage may be stabilized by controlling the power source voltage of the driving power source 3 in accordance with the dropping amount of the high output voltage.

In the embodiments, the switching device is constituted by the MOSFET 11. The switching device may be constituted by a switching device of another kind such as a bipolar transistor. In the third embodiment, the switching device connected in parallel to the diode 12 is constituted by the transistor 24. Alternatively, this device may be constituted by a switching device of another kind such as a MOSFET or a bipolar transistor.

In the embodiments, the clamping circuit 14 is constituted by the two diodes 12 and 13. The clamping circuit 14 may have another configuration as far as it can clamp the voltage across the both terminals of the resonance capacitor 6 to the power source voltage of the driving power source 3 during a period from the end of a damper period to a subsequent ON state period, and may be constituted by using circuit components other than the diodes 12 and 13.

Figure 15:
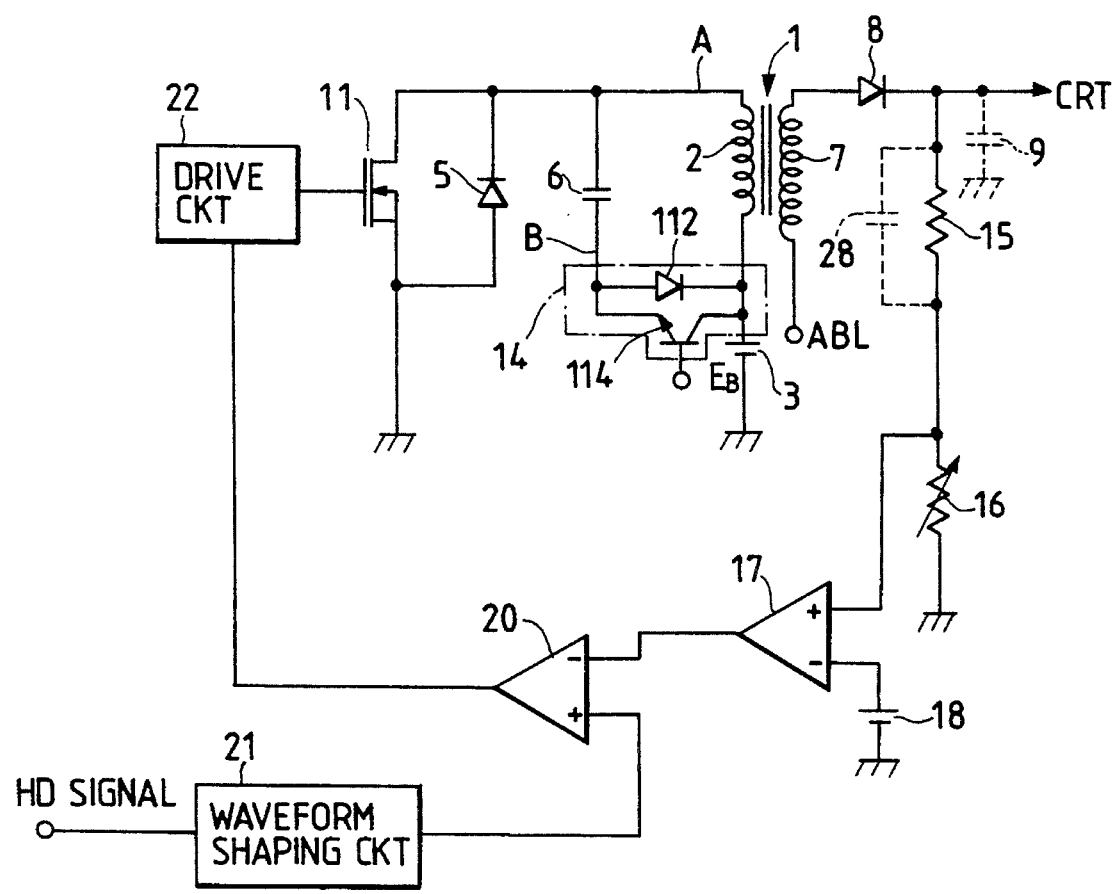
FIG. 15 is a circuit diagram of a sixth embodiment of the invention.

FIG. 15 shows a resonance power circuit according to a sixth embodiment of the present invention. In FIG. 15, a clamping diode 112 and a transistor 114 are disposed instead of the diodes 12 and 13 as the clamping circuit 14. The other configuration of the circuit except for these components 112 and 114 is the same as that of the first embodiment shown in FIG. 3. Therefore, the description of the same or corresponding components and their operation will be omitted.

In the circuit of FIG. 15, one terminal of a resonance capacitor 6 is connected to the winding end terminal of the primary coil 2, and the other terminal of the resonance capacitor 6 is connected to the anode of the clamping diode 112. The cathode of the clamping diode 112 is connected to the node of the primary coil 2 and the driving power source 3. The transistor 114 is connected in parallel to the clamping diode 112. The MOSFET 11 functions as the switching device whereas the transistor 114 functions as a part of the clamping circuit 14. A control signal, which rises at the OFF state of the drive signal and falls to the OFF level during the damper period as shown in FIG. 4(f), is supplied to the transistor 114.

In the circuit, when the MOSFET 11 is turned OFF, a current flows from the primary coil 2 toward the driving power source 3 along the route lying through the resonance capacitor 6 and the clamping diode 112. This causes the LC series resonance of the inductance of the primary coil 2 and the capacitance of the resonance capacitor 6 to start, thereby generating a flyback pulse (voltage pulse). The flyback pulse has a peak value when all the electromagnetic energy accumulated in the primary coil 2 has been converted into the electrostatic energy of the resonance capacitor 6. The transistor 114 continues to be ON after the MOSFET 11 is turned OFF. Therefore, after all the electromagnetic energy accumulated in the primary coil 2 has been transferred to the resonance capacitor 6, a reverse current flows from the driving power source 3 along the route lying through the transistor 114, the resonance capacitor 6, and the primary coil 2 in this sequence. Then, the electrostatic energy of the resonance capacitor 6 is gradually inverted into the electromagnetic energy of the primary coil 2.

In the embodiment, the circuit which prevents the voltage pulse $P_W$ from being generated has a very simple circuit configuration where only the clamping diode 112 and the sole transistor 114 are used, and does not require a switching device for blocking the current flow and a complex circuit for controlling the switching device. This enables the circuit configuration to be simplified, and the cost of the circuit to be largely reduced.

Further, the clamping diode 112 of the embodiment is so arranged as to clamp the voltage across the both terminals of the resonance capacitor 6 to the power source voltage, whereby the generation of the useless voltage pulse $P_W$ is prevented. Therefore, the circuit in FIG. 15 is free from the above-mentioned restriction that the ON period of the MOSFET 11 must overlap with the damper period as indicated by the broken line in FIG. 2(c). This allows the pulse width of the drive signal for switching the MOSFET 11, to be widened at the maximum to the width of the horizontal drive signal, so that the voltage can be controlled in a very wide range.

In the embodiment, since the transistor 114 which is in the ON state during the period from the OFF operation of the MOSFET 11 to the damper period is connected in parallel to the clamping diode 112, the generated flyback pulse can have an ideal waveform which is laterally symmetric. Namely, in the case where the transistor 114 is not provided, the following phenomenon occurs. When the flyback pulse is to be generated, the MOSFET 11 is turned OFF so that the electromagnetic energy of the primary coil 2 is converted into the electrostatic energy of the resonance capacitor 6. When the electrostatic energy of the resonance capacitor 6 is then to be inversely converted into the electromagnetic energy of the primary coil 2, the forward direction of the clamping diode 112 is contrary to the direction of the inverse conversion. Therefore, a current does not flow from the driving power source 3, whereby a step-like level difference corresponding to the power source voltage $E_B$ of the driving power source 3 is formed between the peak value of the left half of the waveform and that of the right half of the waveform. This level difference causes the high voltage regulation characteristics of the flyback transformer 1 to be impaired.

By contrast, in the embodiment, since the transistor 114 is ON during the period of generation of the flyback pulse, a current flows from the driving power source 3 even when the electrostatic energy of the resonance capacitor 6 is then inversely converted into an electromagnetic energy of the primary coil 2. Accordingly, the peak value of the left half of the waveform becomes equal to that of the right half of the waveform, so as to obtain an ideal flyback pulse which has no step-like level difference and is laterally symmetric in waveform as shown in FIG. 8(b), whereby the high voltage regulation characteristics of the flyback transformer 1 is prevented from being impaired.

Figure 16:
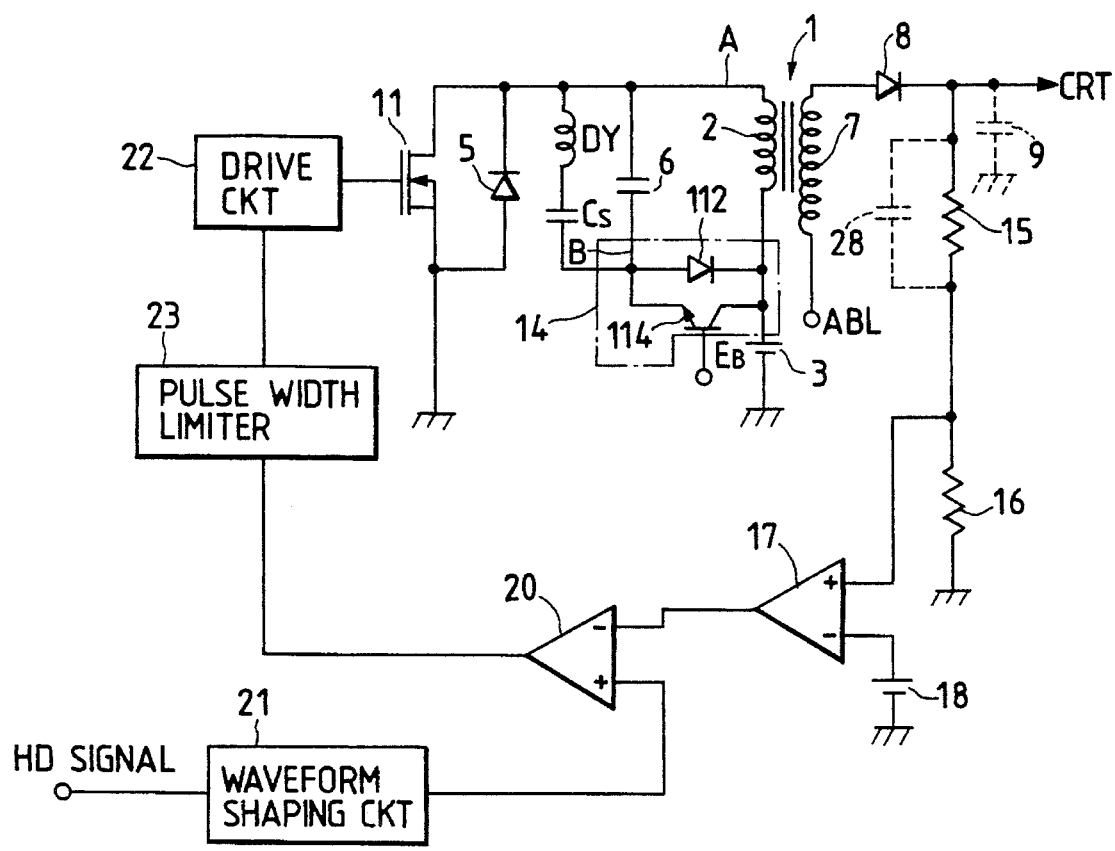
FIG. 16 is a circuit diagram of a seventh embodiment of the invention.

FIG. 16 is a resonance power circuit according to a seventh embodiment of the invention. In the embodiment, a series circuit of a deflection yoke $D_Y$ and an S-shape-correction capacitor $C_S$ is connected in parallel to the resonance capacitor 6, so as to realize a circuit configuration in which both the high voltage generation and the deflection driving are conducted. Further, a pulse-width limiter 23 is connected between the comparator 20 and the drive circuit 22. The other configuration of the embodiment is the same as that of the sixth embodiment shown in FIG. 15, and the advantage obtained by provision of the pulse-width limiter 23 is the same as that of the second embodiment shown in FIG. 5.

Figure 17:
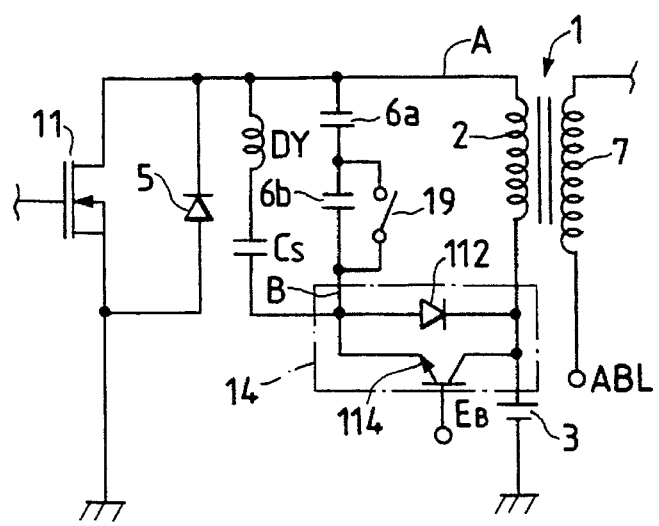
FIG. 17 is a circuit diagram of a modified embodiment which is provided with an element for switching the resonance capacity.

As shown in an alternative circuit for the multiscan driving of FIG. 17, the resonance capacitor 6 may be composed of a series circuit of capacitors 6a and 6b, and the resonance capacity may be changed over by a switch 19 depending on the low-frequency driving or the high-frequency driving, as in the circuit of FIG. 6.

Figure 18B:
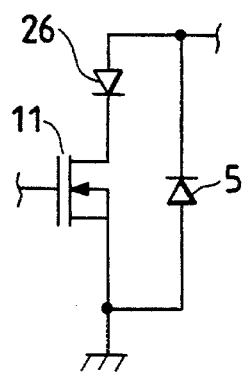
FIGS. 18(a), 18(b) and 18(c) are circuit diagrams illustrating various circuits for eliminating an oscillatory noise, respectively.
Figure 18A:
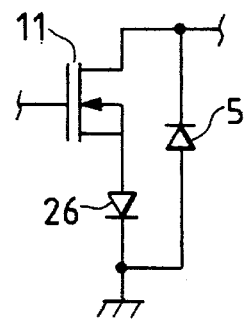
Figure 18C:
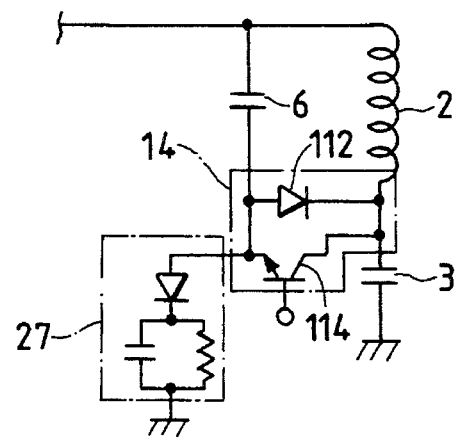

In the operation of the circuit of each of the sixth and seventh embodiments, in order to further bring the circuit characteristics to perfection, the oscillatory noise in the period from $t_3$ to $t_4$ in FIG. 11 may be eliminated by substantially reducing the parasitic capacity of the MOSFET 11. This can be realized by modifying the circuit in such a manner that, as shown in FIG. 12(a), a saturable core 25 is connected to an adequate position such as the gate of the MOSFET 11, or that, as shown in FIG. 18(a) or 18(b), a diode 26 is connected in series to the source of the MOSFET 11 as if the internal capacities of the MOSFET 11 and the diode 26 are connected to each other in series. Alternatively, the oscillatory noise may be eliminated by providing a snubber circuit 27 as shown in FIG. 18(c).

In the sixth and seventh embodiments, the switching device is constituted by the MOSFET 11. The switching device may be constituted by a switching device of another kind such as a bipolar transistor. Although the transistor 114 is used as a part of the clamping circuit 14, it may be constituted by a switching device of another kind such as a MOSFET or a bipolar transistor.

In the above description, all the embodiments are directed to a resonance power circuit for generating a high voltage. However, the circuit of the invention may be applied also to a resonance power circuit for generating a low voltage.

According to one aspect of the invention, the control of the peak value of a voltage pulse generated in the primary side, namely the stabilizing control of the secondary voltage can be conducted by controlling the ON period of only one switching device. When the circuit of the invention is to be used as a power circuit for generating a high voltage, therefore, the number of parts of the high voltage stabilizing circuit can be reduced, and the circuit configuration can be extremely simplified. Moreover, a useless voltage pulse disposed to be generated during the period from the end of the damper period to the next turn ON of the switching device can be prevented from being generated, only by providing the clamping circuit which is simple in configuration. Therefore, separate switching devices for blocking such a useless voltage pulse, and a complex control circuit for driving these switching devices are not required, whereby the number of parts can be reduced so as to simplify the circuit configuration, and the cost of the circuit can be largely reduced.

Furthermore, the circuit of the invention is of the resonance type in which charging and discharging operations are conducted every one deflection cycle, and therefore the circuit has a very excellent response to the stabilizing of the high output voltage.

Since the circuit of the invention has a configuration in which the generation of a useless voltage pulse is prevented by a clamping circuit, the circuit is free from the restriction that the ON period of the switching device must overlap with the damper period. Accordingly, the width of the ON pulse for the switching device can be widened in a range from zero to the end of the damper period so that the voltage control range can be remarkably increased as compared with that of the prior art. This makes the circuit of the invention most suitable also for a high voltage power source for multiscan driving.

Further, according to another aspect of the invention, when the circuit of the invention is to be used as a power circuit for generating a high voltage, a useless voltage pulse disposed to be generated during the period from the end of the damper period to the next turn ON of the switching device is prevented from being generated, only by providing the parallel circuit of the clamping diode and the switch as the clamping circuit. Furthermore, the switch in the clamping circuit is controlled so as to be turned ON during the OFF period of the switching device and turned OFF during the damper period. Therefore, the control circuit can be simply configured, or a complex control circuit which is used in the prior art is not required, whereby the number of parts can be reduced and the cost of the circuit can be largely reduced.

During the period from the end of the damper period to the next turn ON of the switching device, the clamping operation of the combination of the clamping diode and the switch prevents a circulating current from flowing in the circuit. Therefore, there is no circuit loss due to such a circulating current, thereby improving the efficiency of driving the circuit.

In the circuit of the invention, the generation of the above-mentioned useless voltage pulse is prevented from occurring by a configuration in which the clamping diode is employed to clamp the voltage across the both terminals of the resonance capacitor to the power source voltage. Accordingly, the circuit is free from the restriction that the ON period of the switching device must overlap with the damper period. Therefore, the width of the ON pulse for the switching device can be widened so as to be equal to the pulse width of the horizontal drive signal so that the voltage control range can be remarkably increased as compared with that of the prior art. This makes the circuit of the invention most suitable also for a high voltage power source for multiscan driving.

The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A resonance power circuit for generating a high output voltage, comprising:

a flyback transformer having a primary coil and a secondary coil;

a driving power source connected to said primary coil of said flyback transformer;

a switching device for conducting an ON/OFF control of a current which flows through said primary coil;

a resonance capacitor which cooperates with said primary coil for producing a series resonance to generate a flyback pulse when said switching device is in an OFF period;

a detection circuit connected to said secondary coil of said flyback transformer for detecting a voltage output from said secondary coil;

a control circuit for controlling an ON period of said switching device on the basis of the voltage detected by said detection circuit to control a peak level of said flyback pulse;

a damper diode for allowing a reverse current to flow through said primary coil during a damper period; and a clamping circuit for clamping a voltage across both terminals of said resonance capacitor to a voltage of said driving power source during a period from an end of said damper period to a start of the ON period of said switching device.

2. A resonance power circuit as claimed in claim 1, wherein said series resonance is not produced during a period from the end of said damper period to the beginning of said ON period.

3. A resonance power circuit as claimed in claim 1, wherein said switching device functions as a damper diode which allows a reverse current to flow through said primary coil during the damper period.

4. A resonance power circuit as claimed in claim 1, wherein said switching device comprises a bipolar transistor.

5. A resonance power circuit as claimed in claim 1, further comprising a pulse-width limiter for limiting the peak level of said voltage pulse.

6. A resonance power circuit, comprising:

a transformer having a primary coil and a secondary coil;

a driving power source connected to said primary coil of said transformer;

a switching device for conducting an ON/OFF control of a current which flows through said primary coil;

a resonance capacitor which cooperates with said primary coil for producing a series resonance to generate a voltage pulse when said switching device is in an OFF period;

detection means connected to said secondary coil of said transformer for detecting a voltage output from said secondary coil;

control means for controlling an ON period of said switching device on the basis of the voltage detected by said detection means to control a peak level of said voltage pulse; and a clamping circuit for clamping a voltage across both terminals of said resonance capacitor to a voltage of said driving power source during a period from an end of a damper period to a start of the ON period of said switching device;

wherein said clamping circuit comprises a first diode having a cathode connected to said resonance capacitor and an anode grounded, and a second diode having an anode connected to a node between said first diode and said resonance capacitor and a cathode connected to a node between said driving power source and said primary coil.

7. A resonance power circuit as claimed in claim 6, further comprising a snubber circuit connected in parallel to said first diode of said clamping circuit.

8. A resonance power circuit as claimed in claim 6, further comprising a switch which is connected in parallel to said first diode of said clamping circuit and turned on during a period when said voltage pulse is generated.

9. A resonance power circuit as claimed in claim 8, wherein said switch comprises a transistor.

10. A resonance power circuit as claimed in claim 8, wherein said switch comprises a MOSFET.

11. A resonance power circuit as claimed in claim 8, wherein said switch comprises a bipolar transistor.

12. A resonance power circuit as claimed in claim 6, wherein said switching device comprises a MOSFET.

13. A resonance power circuit as claimed in claim 12, further comprising a diode connected in series to a source of said MOSFET; and a damper diode connected in parallel to a circuit including said MOSFET and said diode for allowing a reverse current to flow through said primary coil during a damper period.

14. A resonance power circuit as claimed in claim 12, further comprising a diode connected in series to a drain of said MOSFET; and a damper diode connected in parallel to a circuit including said MOSFET and said diode for allowing a reverse current to flow through said primary coil during a damper period.

15. A resonance power circuit for stabilizing a high output voltage which is for being supplied from a flyback transformer to a cathode ray tube, said flyback transformer having a primary coil and a secondary coil, said primary coil for being connected to a driving power source, comprising:

a MOSFET for conducting an ON/OFF control of a current which flows through said primary coil;

a diode connected in series to said MOSFET for eliminating oscillatory noise;

a damper diode connected in parallel to a circuit including said MOSFET and said diode for allowing a reverse current to flow through said primary coil during a damper period;

a resonance capacitor which cooperates with said primary coil for producing a series resonance to generate a flyback pulse when said MOSFET is in an OFF period;

a detection circuit connected to said secondary coil of said flyback transformer for detecting a voltage output from said secondary coil;

a control circuit for controlling an ON period of said MOSFET on the basis of the voltage detected by said detection circuit to control a peak level of said flyback pulse; and a clamping circuit for clamping a voltage across both terminals of said resonance capacitor to a voltage of said driving power source during a period from an end of the damper period to a start of the ON period of said MOSFET, said clamping circuit being composed of two diodes.

16. A resonance power circuit as claimed in claim 15, wherein said diode is connected to a source of said MOSFET.

17. A resonance power circuit as claimed in claim 15, wherein said diode is connected to a drain of said MOSFET.

18. A resonance power circuit as claimed in claim 15, further comprising a saturable core connected to a gate of said MOSFET.

19. A resonance power circuit, comprising:

a transformer having a primary coil and a secondary coil;

a driving power source connected to said primary coil of said transformer;

a switching device for conducting an ON/OFF control of a current which flows through said primary coil;

a resonance capacitor which cooperates with said primary coil for producing a series resonance to generate a voltage pulse when said switching device is in an OFF period;

detection means connected to said secondary coil of said transformer for detecting a voltage output from said secondary coil;

control means for controlling an ON period of said switching device on the basis of the voltage detected by said detection means to control a peak level of said voltage pulse; and a clamping circuit for clamping a voltage across both terminals of said resonance capacitor to a voltage of said driving power source during a period from an end of a damper period to a start of the ON period of said switching device;

wherein said clamping circuit comprises a clamping diode having an anode connected to said resonance capacitor and a cathode connected to a node between said primary coil and said driving power source, and a switch connected in parallel to said clamping diode.

20. A resonance power circuit as claimed in claim 19, further comprises a snubber circuit connected to a node between said anode of said clamping diode and said switch of said clamping circuit.

21. A resonance power circuit as claimed in claim 19, wherein said switch comprises a transistor.

22. A resonance power circuit as claimed in claim 19, wherein said switch comprises a MOSFET.

23. A resonance power circuit as claimed in claim 19, wherein said switch comprises a bipolar transistor.

24. A resonance power circuit, comprising:

a transformer having a primary coil and a secondary coil;

a driving power source connected to said primary coil of said transformer;

a switching device for conducting an ON/OFF control of a current which flows through said primary coil;

a resonance capacitor which cooperates with said primary coil for producing a series resonance to generate a voltage pulse when said switching device is in an OFF period;

detection means connected to said secondary coil of said transformer for detecting a voltage output from said secondary coil;

control means for controlling an ON period of said switching device on the basis of the voltage detected by said detection means to control a peak level of said voltage pulse; and a clamping circuit for clamping a voltage across both terminals of said resonance capacitor to a voltage of said driving power source during a period from an end of a damper period to a start of the ON period of said switching device;

wherein said resonance capacitor comprises a series circuit of first and second capacitors and a switch connected in parallel to said second capacitor for changing a resonance capacity of said resonance capacitor.

25. A resonance power circuit as claimed in claim 24, wherein said switch of said resonance capacitor comprises a transistor.

26. A resonance power circuit, comprising:

a transformer having a primary coil and a secondary coil, said primary coil for being connected to a driving power source;

a MOSFET for conducting an ON/OFF control of a current which flows through said primary coil, and a saturable core connected to a gate of said MOSFET;

a resonance capacitor which cooperates with said primary coil for producing a series resonance to generate a voltage pulse when said MOSFET is in an OFF period;

a detection circuit connected to said secondary coil of said transformer for detecting a voltage output from said secondary coil;

a control circuit for controlling an ON period of said MOSFET on the basis of the voltage detected by said detection circuit to control a peak level of said voltage pulse; and a clamping circuit for clamping a voltage across both terminals of said resonance capacitor to a voltage of said driving power source during a period from an end of a damper period to a start of the ON period of said MOSFET.

\* \* \* \* \*